United States Patent [19]
Sugawara

[11] Patent Number: 5,661,597
[45] Date of Patent: Aug. 26, 1997

[54] IMAGE DEFLECTION APPARATUS

[75] Inventor: Saburo Sugawara, Kawasaki, Japan

[73] Assignee: Canon Kabushiki Kaisha, Tokyo, Japan

[21] Appl. No.: 281,667

[22] Filed: Jul. 28, 1994

[30] Foreign Application Priority Data

Jul. 29, 1993 [JP] Japan ................. 5-207079
Dec. 22, 1993 [JP] Japan ................. 5-324574

[51] Int. Cl.$^6$ .................. G02B 21/36; G02B 27/64; G02B 13/08; G02B 5/04
[52] U.S. Cl. .................. 359/362; 359/554; 359/557; 359/668; 359/831; 359/676; 359/678
[58] Field of Search .................. 359/554, 557, 359/668, 831, 676, 678, 362

[56] References Cited

U.S. PATENT DOCUMENTS

| | | | |
|---|---|---|---|
| 3,941,451 | 3/1976 | Humphrey | 359/557 |
| 4,265,529 | 5/1981 | Yokota | 354/224 |
| 4,998,809 | 3/1991 | Tsuji et al. | 359/557 |
| 5,073,017 | 12/1991 | Suda | 359/557 |
| 5,140,462 | 8/1992 | Kitagishi | 359/557 |
| 5,182,671 | 1/1993 | Kitagishi et al. | 359/557 |
| 5,315,435 | 5/1994 | Horiuchi | 359/554 |

FOREIGN PATENT DOCUMENTS 56-21133  5/1981  Japan.
1178916   7/1989  Japan.

*Primary Examiner*—Paul M. Dzierzynski
*Assistant Examiner*—Mohammad Y. Sikder
*Attorney, Agent, or Firm*—Fitzpatrick, Cella, Harper & Scinto

[57] ABSTRACT

An image stabilizer has, in succession from the object side, an objective lens group having at least positive refractive power, variable angle prism having its vertical angle variable, and optical prism, and which satisfies the following condition:

$$-20 < \nu_{VAP} - \nu_{RP} < 40,$$

when $\nu_{VAP}$ is the Abbe's number of the variable angle prism, and $\nu_{RP}$ is the mean value of the Abbe's number of the optical prism.

8 Claims, 14 Drawing Sheets

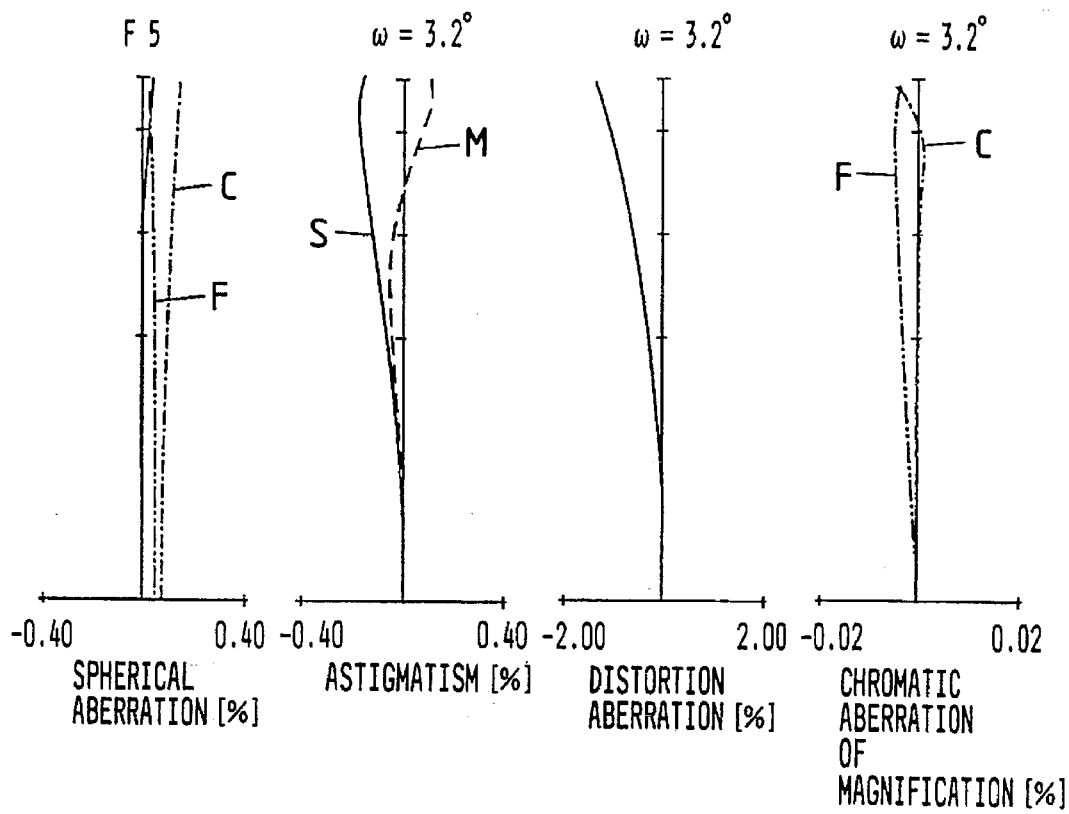
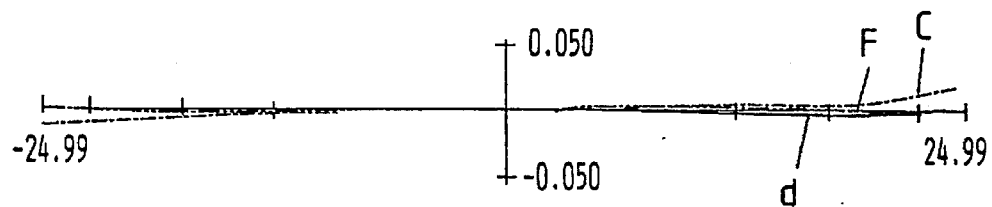
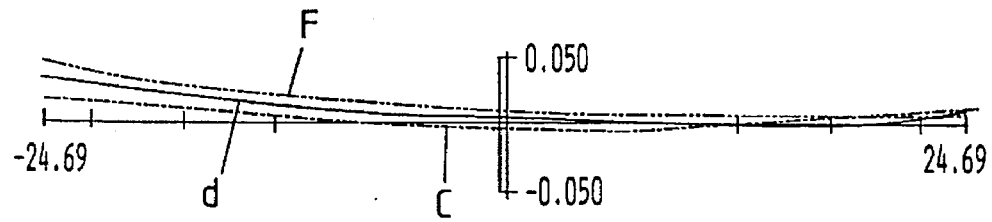

FIG. 6A    FIG. 6B    FIG. 6C    FIG. 6D
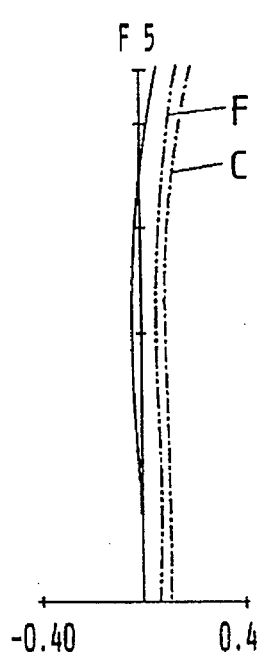
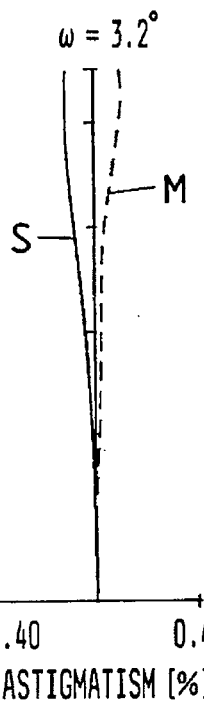
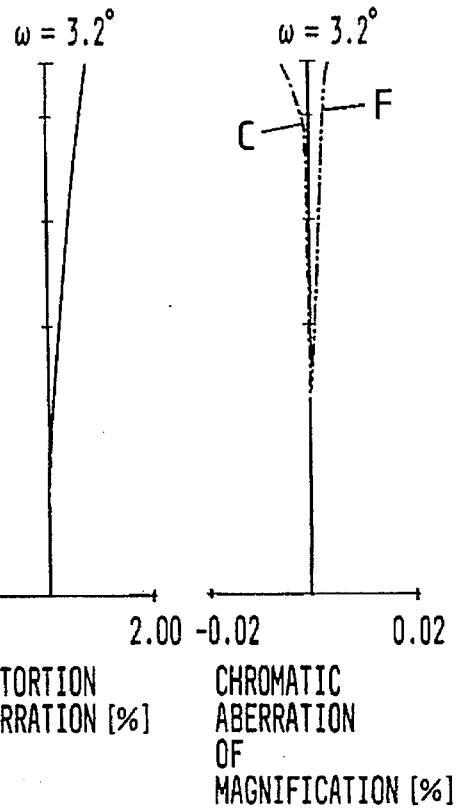
SPHERICAL ABERRATION [%]    ASTIGMATISM [%]    DISTORTION ABERRATION [%]    CHROMATIC ABERRATION OF MAGNIFICATION [%]
FIG. 7A
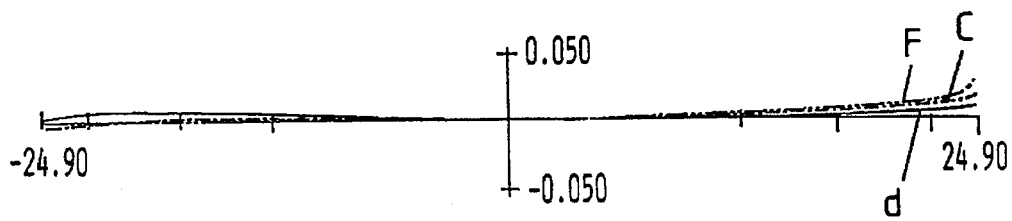
FIG. 7B
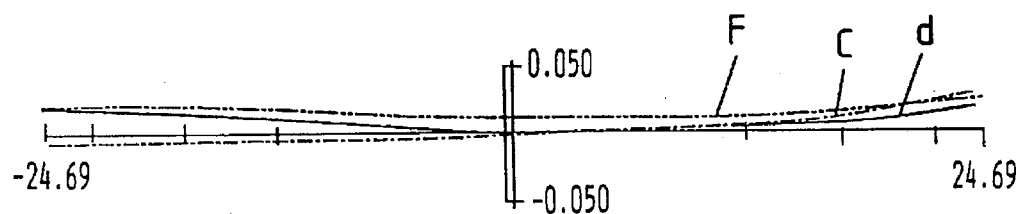

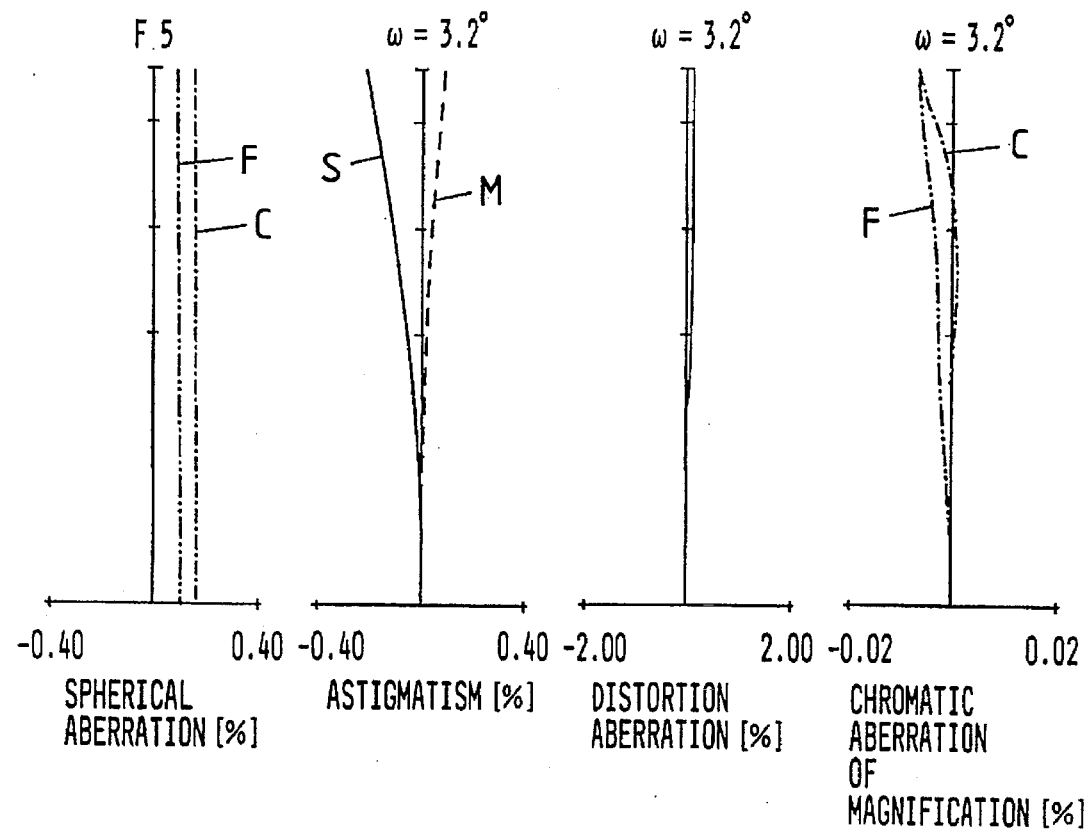
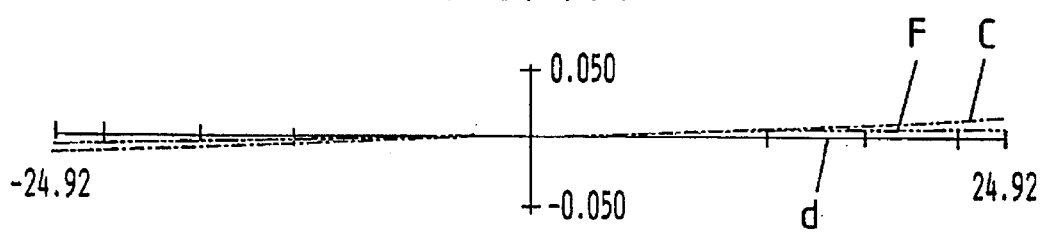
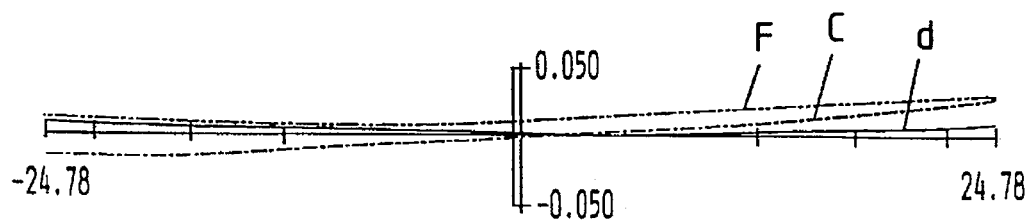

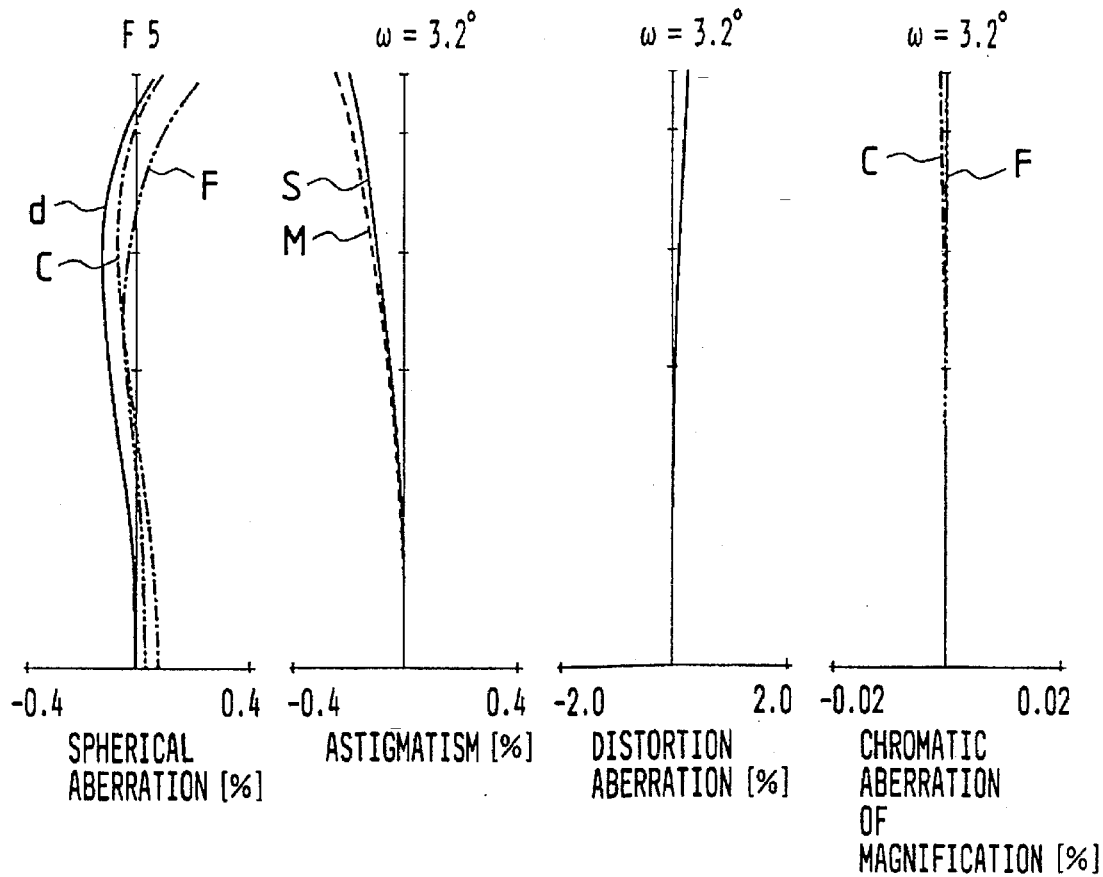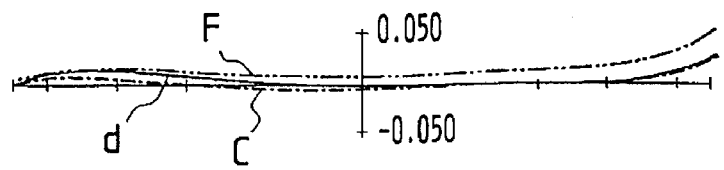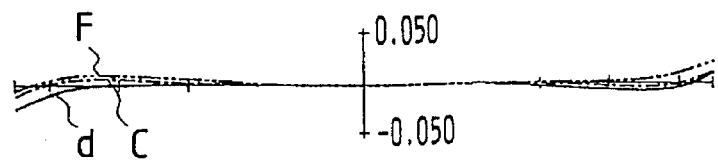

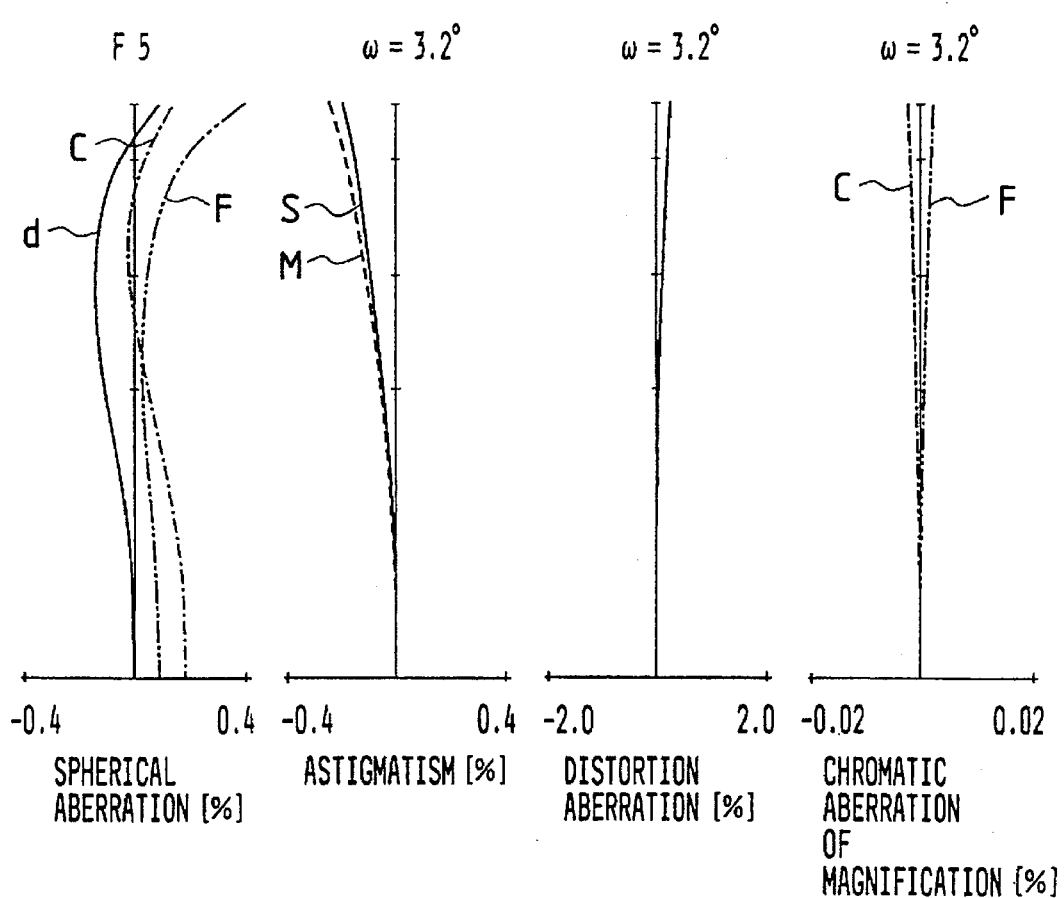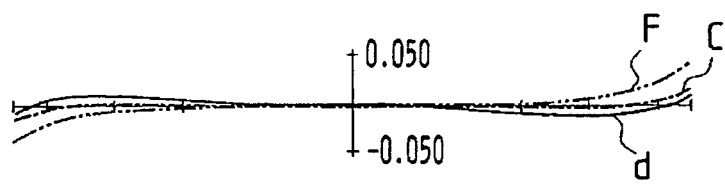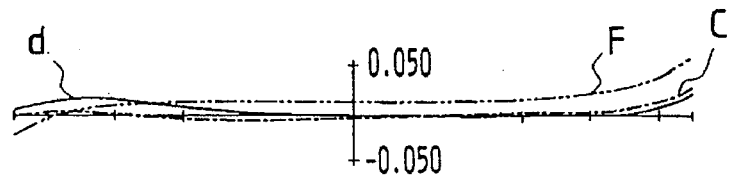

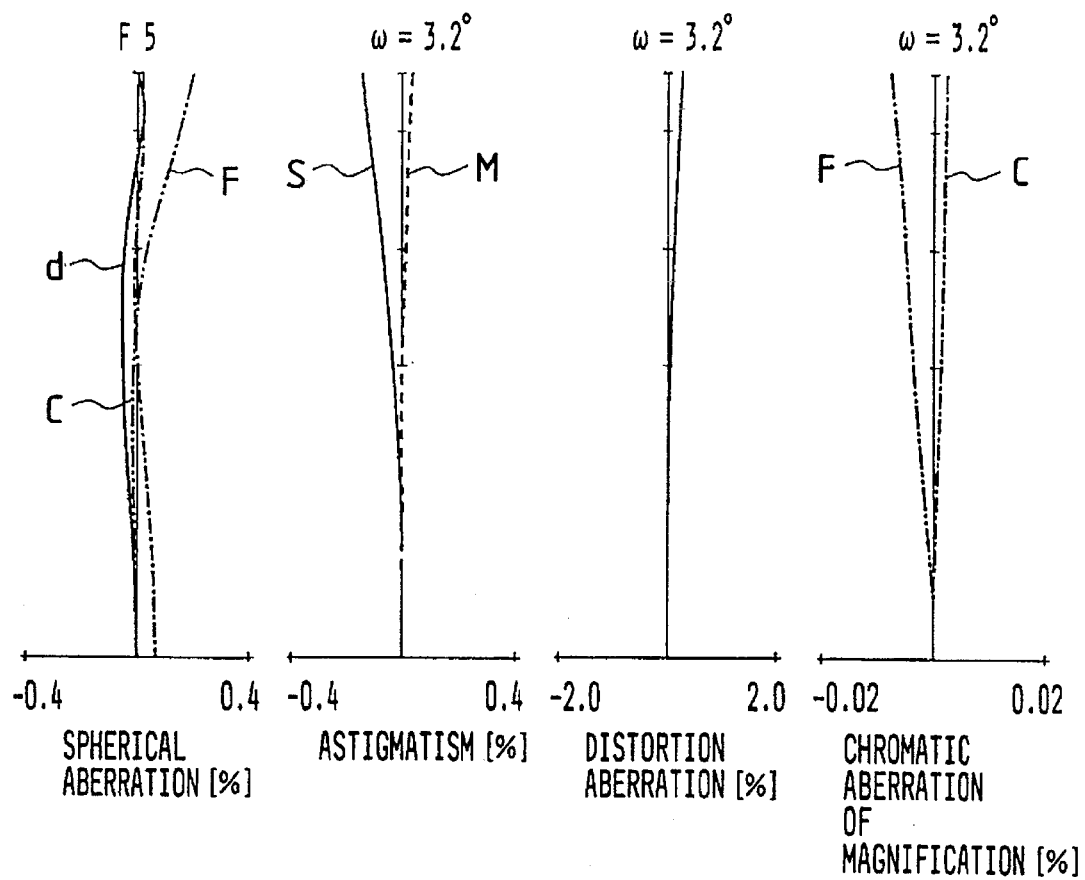
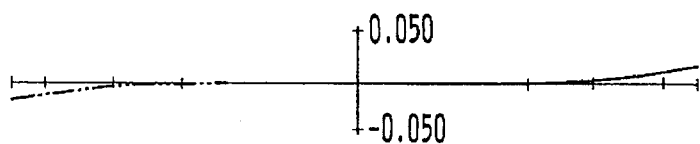
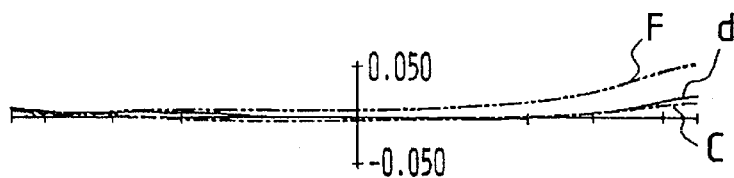

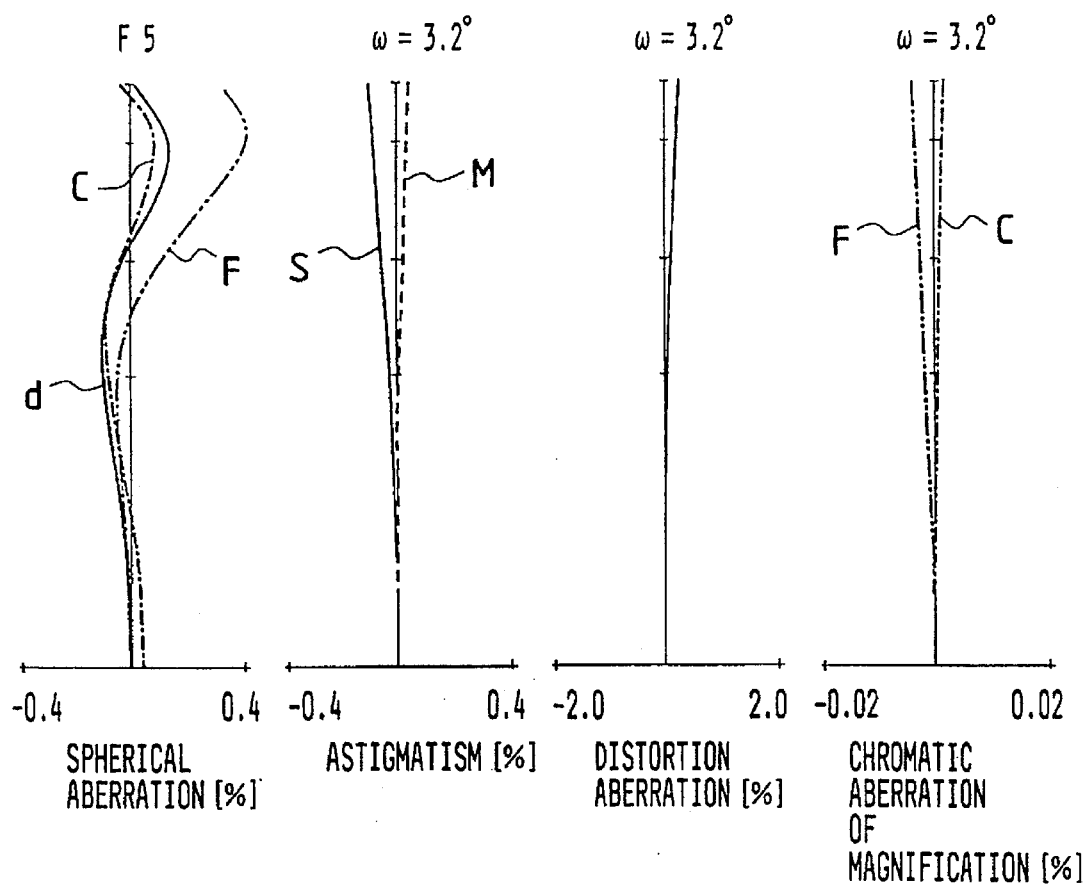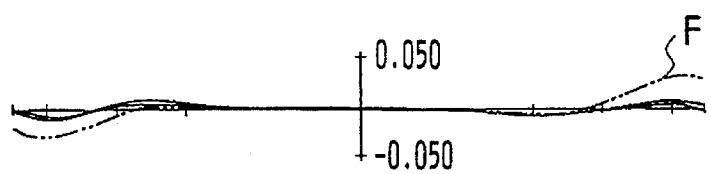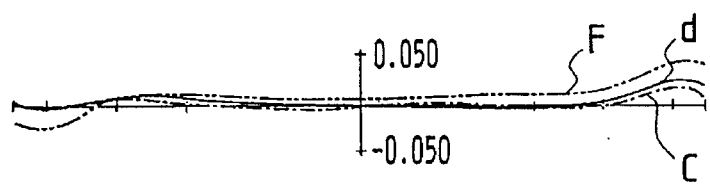

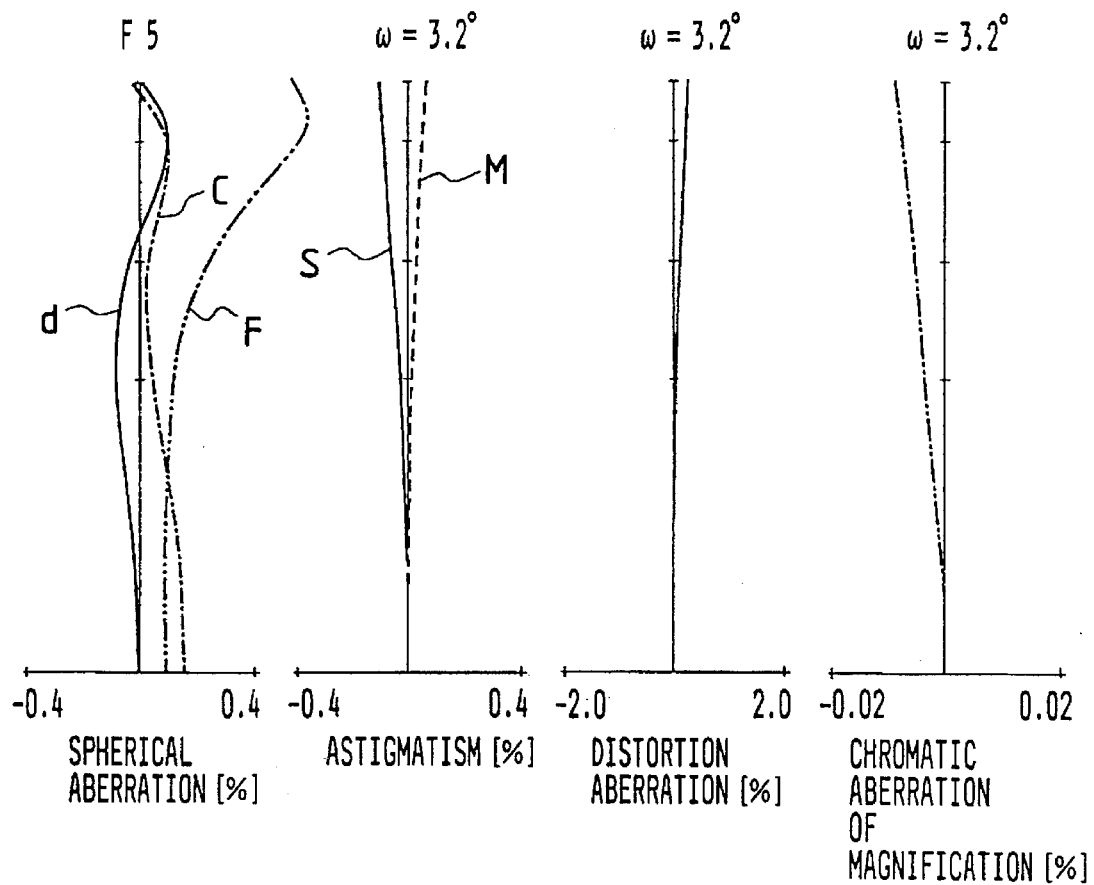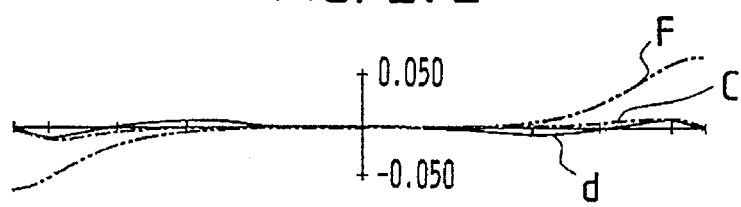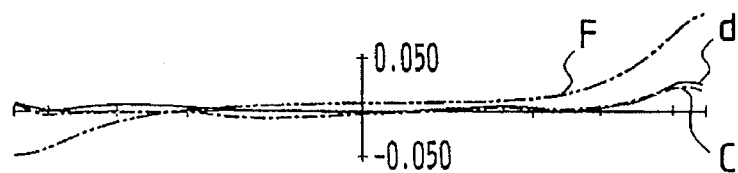

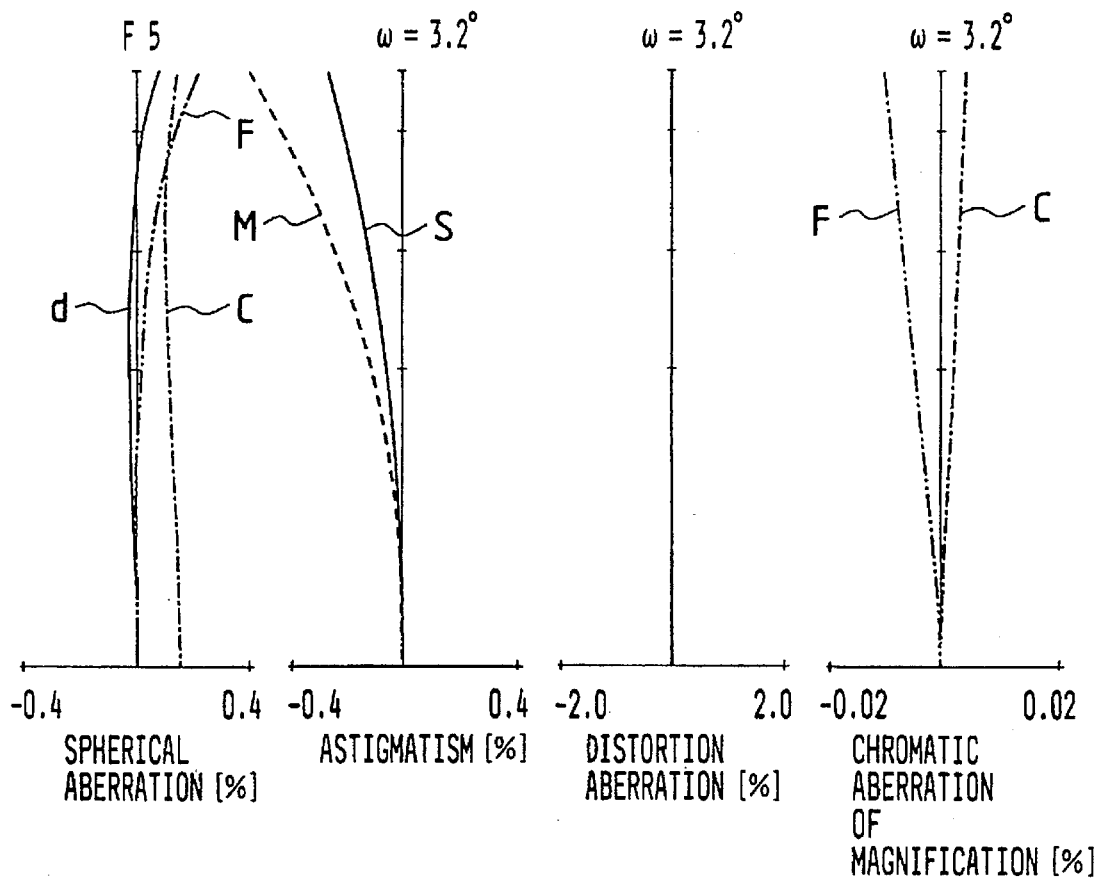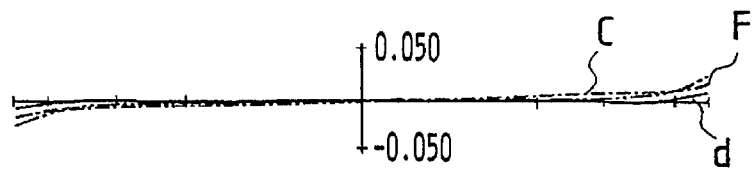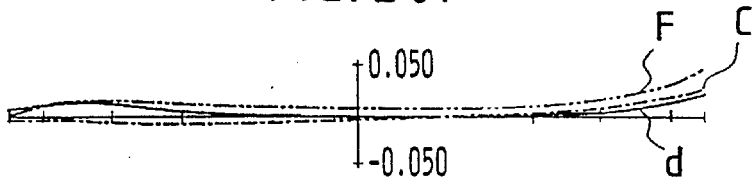

IMAGE DEFLECTION APPARATUS

BACKGROUND OF THE INVENTION

1. Field of the Invention

This invention relates to an optical system having image deflecting means, and particularly to an optical system having image deflecting means suitable for a telescope, binoculars, a photographing system or the like wherein a variable angle prism having its vertical angle variable is provided in a lens system and an image is deflected by the variable vertical angle prism to thereby stabilize the vibration of the image caused by vibration or the like.

2. Related Background Art

When an object is observed from on a running vehicle or the like by means of an optical system such as a telescope, the vibration of the vehicle is transmitted to the optical system to cause vibration (blurring) to be created in an image. There have heretofore been proposed various optical systems having image deflecting means wherein a plane parallel plate or a variable angle prism is disposed in an optical system to thereby correct the vibration of the image at such time.

For example, an optical system in which a variable angle prism is utilized to correct the vibration of an image is proposed in Japanese Patent Publication No. 56-21133. In this publication, liquid or a transparent elastic member is enclosed between two plane parallel glass plates and the angle formed by the two plane parallel plates is made variable to thereby correct the vibration of the image.

Besides this, this publication proposes a photographing system in which a plano-convex lens and a plano-concave lens each having a curvature are slid between spherical surfaces to thereby make the angle formed by the opposed planar surfaces variable and correct the vibration of an image.

Generally, where a variable angle prism is disposed forwardly of or in a lens system to correct the vibration of an image, when the vertical angle of the variable angle prism is given a certain degree of angle, the deflection of the image and chromatic aberration of eccentric magnification are created by the color dispersion of the prism.

An optical system in which the chromatic aberration of eccentric magnification at such time is corrected well by appropriately selecting the material of the variable angle prism is proposed, for example, in Japanese Laid-Open Patent Application No. 1-178916.

Generally, when an attempt is made to vary the vertical angle of a variable angle prism to thereby correct the vibration of an image, the vertical angle of the prism is enlarged and chromatic aberration of eccentric magnification increases proportionally, and the quality of the image becomes deteriorated. It is very difficult to correct the chromatic aberration of eccentric magnification at this time by an optical system including a variable angle prism while contriving the simplification of the lens construction, and unavoidably the lens construction tends to become complicated.

For example, in binoculars using a pair of optical systems, use must be made of a simple lens construction and therefore, when image deflecting means comprising a variable angle prism is applied to it to thereby correct the vibration of an image, chromatic aberration of eccentric magnification poses a great problem.

SUMMARY OF THE INVENTION

The present invention has as its object the provision of an optical system having image deflecting means in which when the vibration of an image caused by vibration or the like is to be corrected by the use of image deflecting means comprising a variable angle prism, the lens construction of a first lens group disposed more adjacent to the object side than said variable angle prism and a second lens group disposed on the image plane side and the construction of said variable angle prism are appropriately set to thereby reduce the creation of chromatic aberration of eccentric magnification and which can correct the vibration of the image while maintaining a high optical performance.

The optical system having image deflecting means according to the present invention is characterized in that when a beam of light from an object is passed through the first lens group, the image deflecting means, an erecting prism and the second lens group to form the erect real image of the object on a predetermined plane, said image deflecting means comprises a variable angle prism having its prism vertical angle variable, said first lens group comprises positive refractive power having at least one positive lens and two negative lenses LN11 and LN12, and said second lens group comprises a positive lens LP2.

Also, the optical system has, in succession from the object side, objective lens means having positive refractive power, variable angle prism means and optical prism means, and satisfies the following condition:

$$-20 < v_{VAP} - v_{RP} < 40,$$

where $v_{VAP}$ is the Abbe's number of said variable angle prism means, and $v_{VAP}$ is the mean value of the Abbe's number of said optical prism means.

BRIEF DESCRIPTION OF THE DRAWINGS

FIGS. 4A to 4D show aberrations in numerical value embodiment 1 of the present invention.

FIGS. 5A and 5B show the aberrations when the prism vertical angle of a variable angle prism in numerical value embodiment 1 of the present invention is 0° and 1°.

FIGS. 6A to 6D show aberrations in numerical value embodiment 2 of the present invention.

FIGS. 7A and 7B show the aberrations when the prism vertical angle of a variable angle prism in numerical value embodiment 2 of the present invention is 0° and 1°.

FIGS. 8A to 8D show aberrations in numerical value embodiment 3 of the present invention.

FIGS. 9A and 9B show the aberrations when the prism vertical angle of a variable angle prism in numerical value embodiment 3 of the present invention is 0° and 1°.

FIGS. 23A to 23F show aberrations in numerical value embodiment 4.

FIGS. 24A to 24F show aberrations in numerical value embodiment 5.

FIGS. 25A to 25F show aberrations in numerical value embodiment 6.

FIGS. 26A to 26F show aberrations in numerical value embodiment 7.

FIGS. 27A to 27F show aberrations in numerical value embodiment 8.

FIGS. 30A to 30F show aberrations in the tenth embodiment of the present invention.

BRIEF DESCRIPTION OF THE PREFERRED EMBODIMENTS

Figure 1:
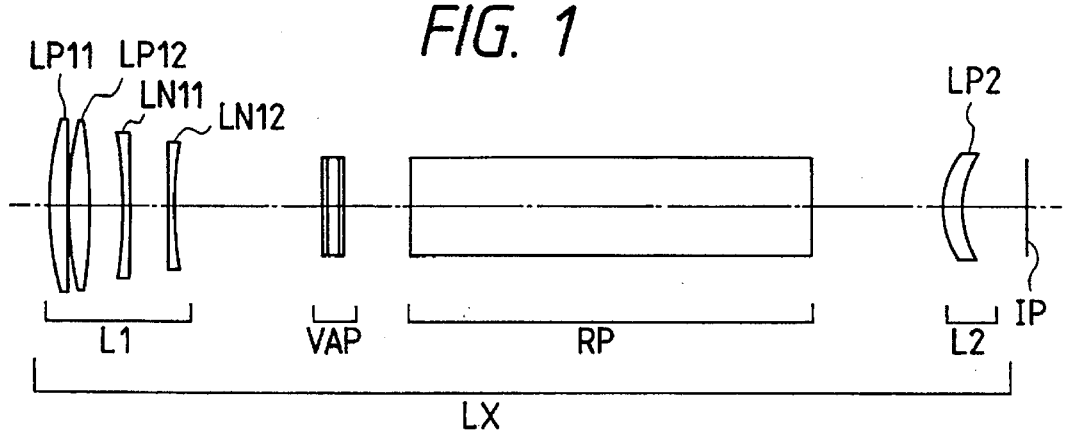
FIG. 1 is a lens cross-sectional view of numerical value embodiment 1 of the present invention.
Figure 2:
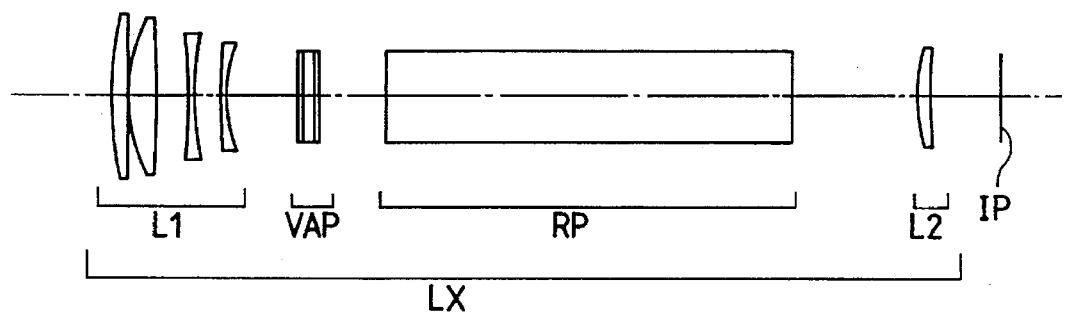
FIG. 2 is a lens cross-sectional view of numerical value embodiment 2 of the present invention.
Figure 3:
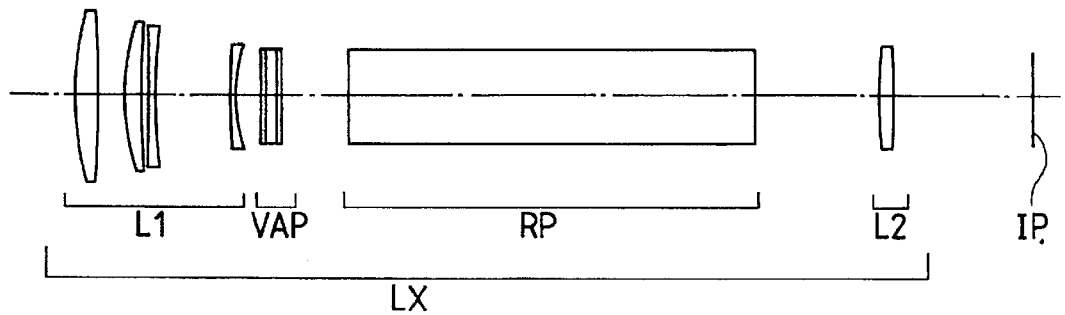
FIG. 3 is a lens cross-sectional view of numerical value embodiment 3 of the present invention.

FIGS. 1, 2 and 3 are lens cross-sectional views of numerical value embodiments 1, 2 and 3, respectively, of an optical system LX having image deflecting means according to the present invention. FIGS. 4A–4D to FIGS. 9A and 9B show aberrations in numerical value embodiments 1 to 3 of the present invention.

In FIGS. 1 to 3, LX designates an optical system. L1 denotes a first lens group of positive refractive power, and VAP designates a variable angle prism having its prism vertical angle variable. The variable vertical angle prism VAP constitutes a portion of image deflecting means. RP denotes an erecting prism comprising, for example, a porroprism. In these figures, the erecting prism is shown as a glass block in which an optical path is developed. L2 designates a second lens group of positive refractive power. IP denotes an imaging plane in which is formed the aerial image of an erect real image by the optical system LX. When the erecting prism RP is not used as the optical system LX, the aerial image of an inverted real image is formed in the image plane IP.

In the present embodiment, the prism vertical angle of the variable angle prism VAP is varied to thereby stabilize the vibration of an image occurring when the optical system LX vibrates. The variable angle prism VAP is comprised of two glass plates and transparent silicone rubber enclosed therebetween, and the vertical angle thereof is varied by driving the prism VAP by an actuator and a beam of light passing therethrough is deflected to thereby stabilize the vibration of the image.

The first lens group L1 (objective lens) comprises, in succession from the object side, two positive lenses LP11 and LP12 and two negative lenses LN11 and LN12, and the second lens group L2 comprises a positive lens LP2. The negative lens LN12 is moved on the optical axis thereof to thereby effect focusing.

In the present embodiment, each element is set as described above, thereby decreasing chromatic aberration of eccentric magnification occurring when the prism vertical angle of the variable angle prism VAP is varied to thereby stabilize the vibration of the image, and maintaining a good optical performance.

Figure 10:
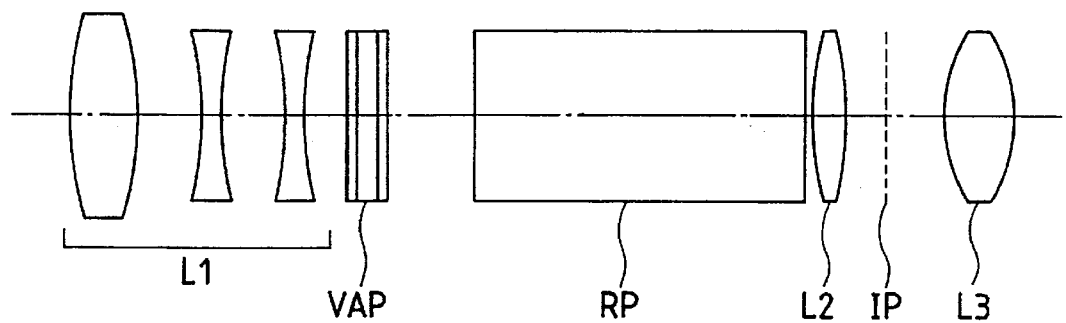
FIG. 10 is a schematic view of the essential portions of an optical system when the present invention is applied to binoculars.

FIG. 10 is a schematic view showing a case where a third lens group of positive refractive power is provided on the imaging plane IP side of the optical system LX having image deflecting means according to the present embodiment and is used as the afocal system of binoculars or the like.

Figure 11:
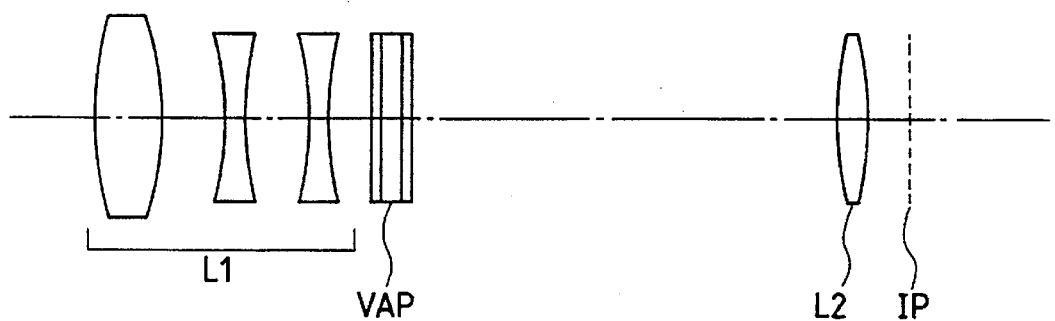
FIG. 11 is a schematic view of the essential portions of the optical system when the present invention is applied to a photographic lens.

FIG. 11 is a schematic view showing a case where the optical system LX having image deflecting means according to the present embodiment is used as the photo-taking system of a photographic lens or the like. In this case, the erecting prism RP is unnecessary and the imaging plane IP provides a photosensitive surface such as a film surface.

Figure 12:
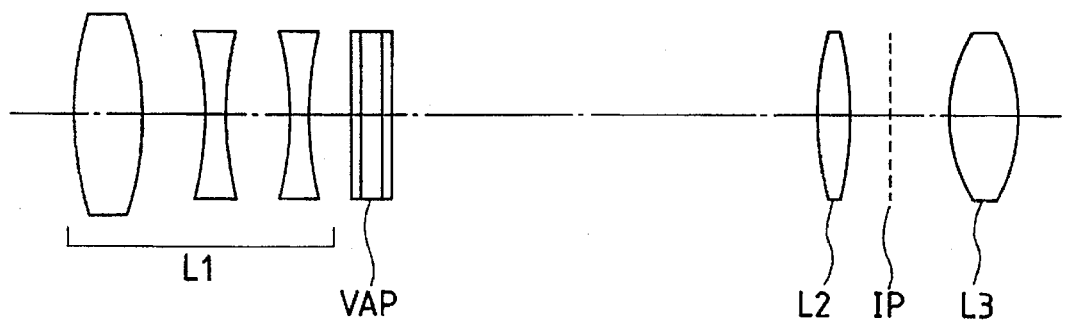
FIG. 12 is a schematic view of the essential portions of the optical system when the present invention is applied to an astronomical telescope.
Figure 13:
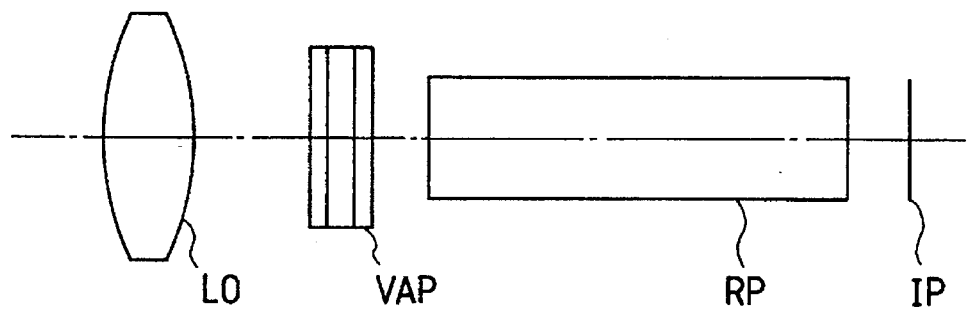
FIG. 13 is a schematic view of an optical system according to the present invention.
Figure 14:
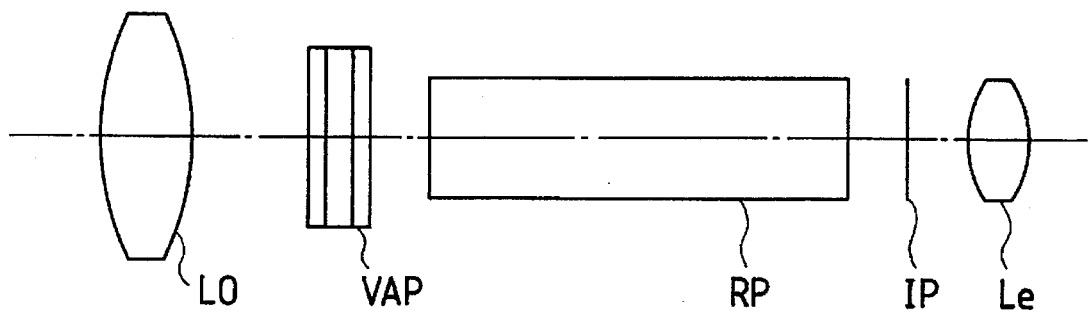
FIG. 14 is a schematic view of the optical system according to the present invention.
Figure 15:
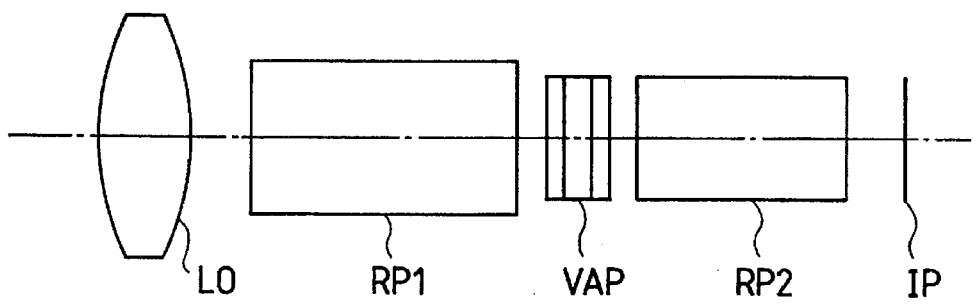
FIG. 15 is a schematic view of the optical system according to the present invention.
Figure 16:
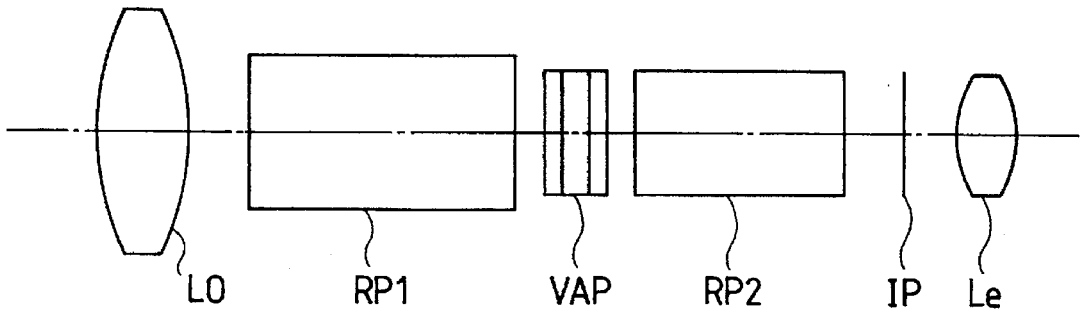
FIG. 16 is a schematic view of the optical system according to the present invention.
Figure 17:
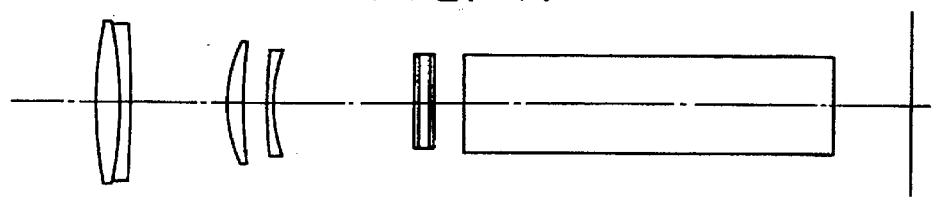
FIG. 17 is a cross-sectional view of a fourth embodiment of the present invention.
Figure 18:
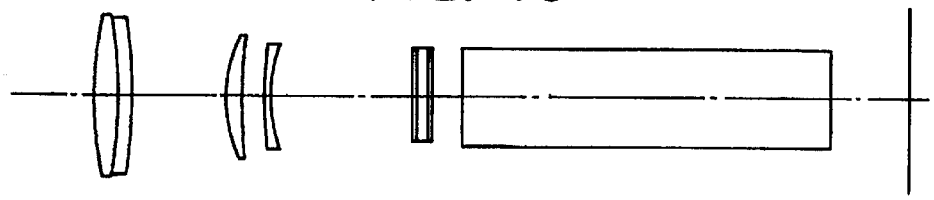
FIG. 18 is a cross-sectional view of a fifth embodiment of the present invention.
Figure 19:
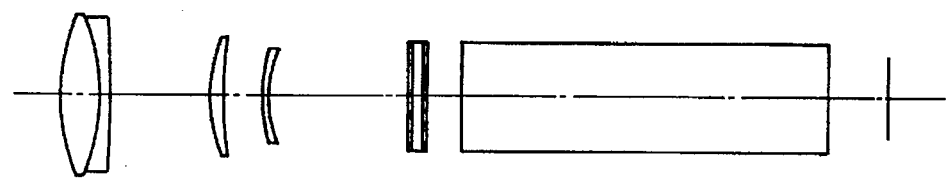
FIG. 19 is a cross-sectional view of a sixth embodiment of the present invention.
Figure 20:
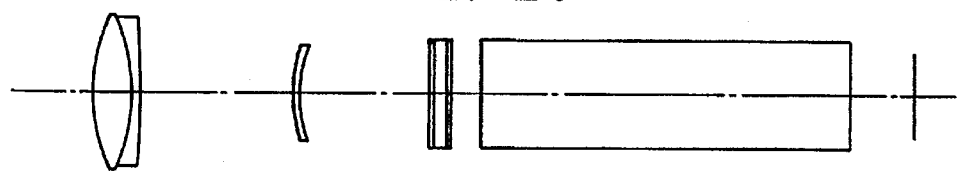
FIG. 20 is a cross-sectional view of a seventh embodiment of the present invention.
Figure 21:
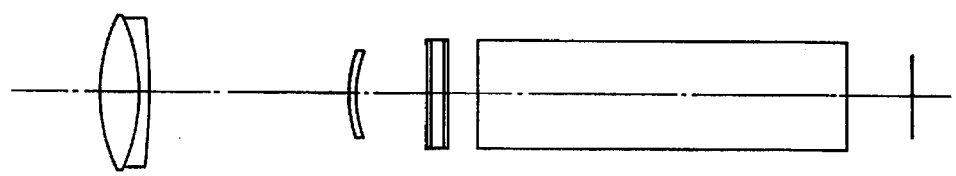
FIG. 21 is a cross-sectional view of an eighth embodiment of the present invention.
Figure 22:
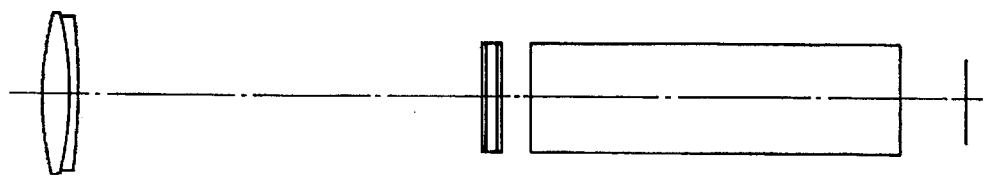
FIG. 22 is a cross-sectional view of a ninth embodiment of the present invention.
Figures 28A, 28B, 28C, 28D:
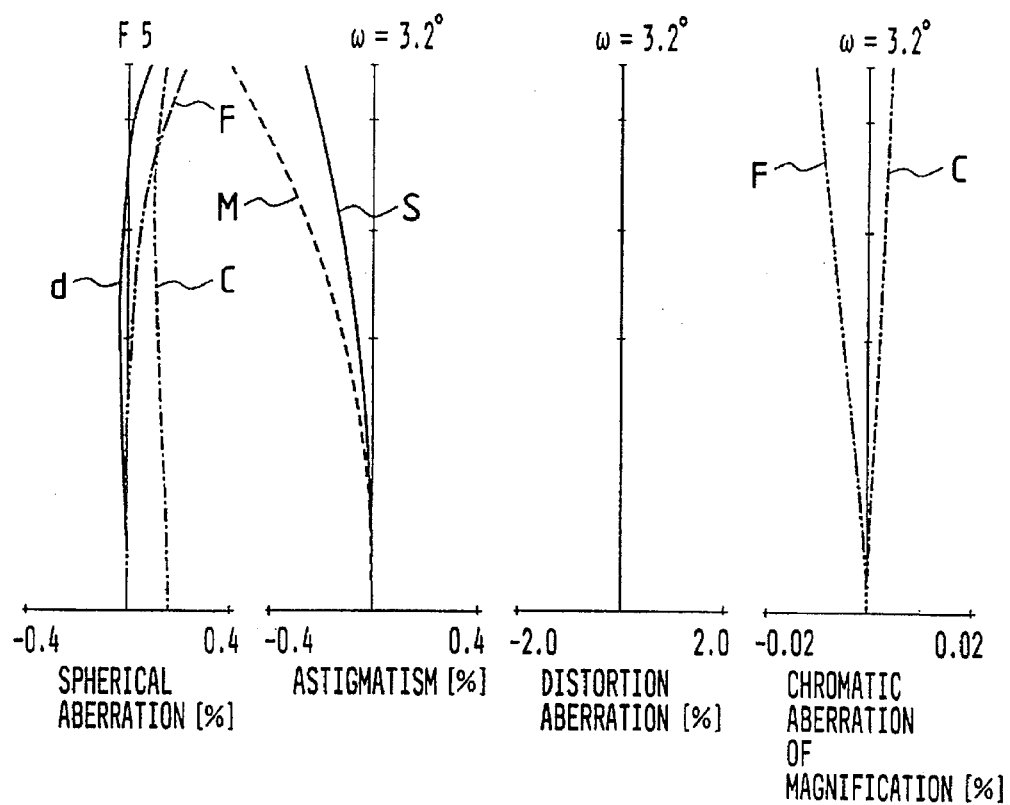
FIGS. 28A to 28F show aberrations in numerical value embodiment 9.
Figure 28E:
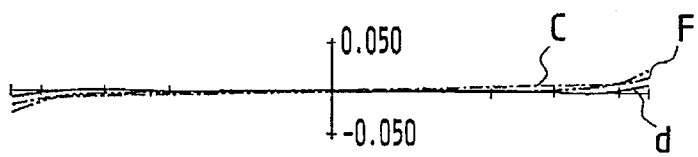
Figure 28F:
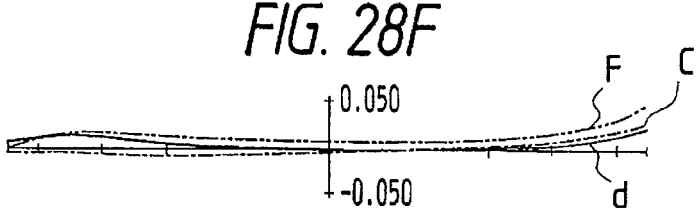
Figure 29:
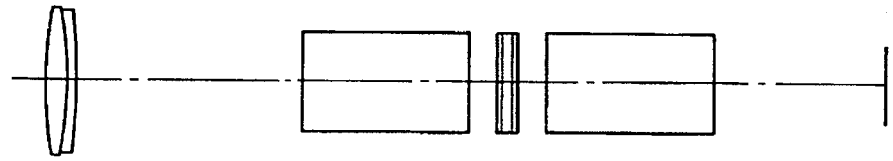
FIG. 29 is a cross-sectional view of a tenth embodiment of the present invention.

FIG. 12 is a schematic view showing a case where a third lens group of positive refractive power is provided on the imaging plane IP side of the optical system LX having image deflecting means according to the present embodiment and is used as the afocal system of an astronomical telescope or the like. In an astronomical telescope, top and bottom and right and left may be reverse images and therefore, the erecting prism is eliminated.

In the present invention, to reduce the amount of creation of chromatic aberration of eccentric magnification and maintain the optical performance of the whole image field good when the prism vertical angle of the variable angle prism is varied to stabilize the vibration of the image, it is preferable to satisfy at least one of the following conditions:

$$-20 < v_{VAP} - v_{P2} < 30 \tag{1}$$

$$10 < v_{P1} - v_{P2} < 50 \tag{2}$$

$$-15 < v_{P1} - v_{N11} < 25 \tag{3}$$

$$25 < v_{P1} - v_{N12} < 50 \tag{4}$$

$$-20 < v_{VAP} - v_{RP} < 30 \tag{5}$$

where $v_{VAP}$ and $v_{RP}$ are the Abbe's numbers of the materials of the variable angle prism and the erecting prism, respectively, $v_{P1}$ is the mean value of the Abbe's number of the material of the positive lens in the first lens group, $v_{N11}$ and $v_{N12}$ are the Abbe's numbers of the materials of the two negative lenses LN11 and LN12, respectively, and $v_{P2}$ is the Abbe's number of the material of the positive lens LP2.

In the case of an optical system which does not use the erecting prism, conditional expression (5) is unnecessary.

Conditional expression (1) restricts the difference between the Abbe's number of the material of the variable angle prism and the Abbe's number of the material of the positive lens LP2 in the second lens group. If the lower limit value of conditional expression (1) is exceeded, chromatic aberration of eccentric magnification will become under, and if the upper limit value of conditional expression (1) is exceeded, chromatic aberration of eccentric magnification will become over, and this is not good.

Conditional expression (2) restricts the difference between the mean value of the Abbe's number to of the material of the positive lens in the first lens group and the Abbe's number of the material of the positive lens LP2 in the second lens group. If the lower limit value of conditional expression (2) is exceeded, chromatic aberration of magnification will become under, and if the upper limit value of conditional expression (2) is exceeded, the chromatic aberration of magnification when the angle of the variable angle prism is 0° will become over, and this is not good.

Conditional expression (3) restricts the difference between the mean value of the Abbe's number of the material of the positive lens in the first lens group and the Abbe's number of the material of the negative lens LN11 in the first lens group. If the lower limit value of conditional expression (3) is exceeded, chromatic aberration of magnification will become under, and if the upper limit value of conditional expression (3) is exceeded, chromatic aberration of magnification will become over, and this is not good.

Conditional expression (4) restricts the difference between the mean value of the Abbe's number of the material of the positive lens in the first lens group and the Abbe's number of the material of the negative lens LN12 in the first lens group. If the lower limit value of conditional expression (4) is exceeded, on-axis chromatic aberration will become under, and if the upper limit value of conditional expression (4) is exceeded, on-axis chromatic aberration will become over, and this is not good.

Conditional expression (5) restricts the difference between the Abbe's number of the material of the variable angle prism and the Abbe's number of the material of the erecting prism. If the lower limit value of conditional expression (5) is exceeded, chromatic aberration of eccentric magnification will become under, and if the upper limit value of conditional expression (5) is exceeded, chromatic aberration of eccentric magnification will become over and the Abbe's number of the erecting prism will become small and therefore, the transmittance of the prism will become reduced, and this is not good.

On the other hand, it is preferable to satisfy the following conditions:

$$0.1 < L1/f < 0.5 \quad (6)$$

$$0.01 < L2/f < 0.3 \quad (7)$$

$$0.3 < f2/f < 1.5 \quad (8)$$

where L1 is the distance from the vertex of that lens surface of the first lens group which is adjacent to the object side to that surface of the variable vertical angle prism which is adjacent to the object side, L2 is the air gap between the first lens group and the variable angle prism, and f2 and f are the focal lengths of the second lens group and the whole system, respectively.

Conditional expression (6) restricts the ratio of the distance from the vertex of that lens surface of the first lens group which is adjacent to the object side to the focal length of the whole system. If the lower limit value of conditional expression (6) is exceeded, chromatic aberration of magnification will become over or chromatic aberration of eccentric magnification will become under, and if the upper limit value of conditional expression (6) is exceeded, the variable angle prism will become too near to the image and therefore, the image deflecting effect will decrease, and this is not good.

Conditional expression (7) restricts the ratio of the air gap between the first lens group and the variable angle prism to the focal length of the whole system. If the lower limit value of conditional expression (7) is exceeded, the first lens group will strike against the variable angle prism, and this is not good. If the upper limit value of conditional expression (7) is exceeded, chromatic aberration of eccentric magnification will become under, and this is not good.

Conditional expression (8) restricts the ratio of the focal length of the second lens group to the focal length of the whole system. If the lower limit value of conditional expression (8) is exceeded, chromatic aberration of eccentric magnification will become over, and if the upper limit value of conditional expression (8) is exceeded, chromatic aberration of eccentric magnification will become under, and this is not good.

Also, it is preferable to satisfy the following conditions:

$$0.3 < |f_{N11}/f| < 2 \quad (9)$$

$$0.2 < |f_{N12}/f| < 1 \quad (10)$$

where $f_{11}$ and $f_{N12}$ are the focal lengths of the two negative lenses LN11 and LN12, respectively.

Conditional expression (9) restricts the ratio of the focal length of the negative lens LN11 in the first lens group to the focal length of the whole system. If the lower limit value of conditional expression (9) is exceeded, spherical aberration will become over, and if the upper limit value of conditional expression (9) is exceeded, spherical aberration will become under, and this is not good.

Conditional expression (10) restricts the ratio of the focal length of the negative lens LN12 in the first lens group to the focal length of the whole system. If the lower limit value of conditional expression (10) is exceeded, the full length of the lens will become shorter, but on-axis chromatic aberration will become over, and if the upper limit value of conditional expression (10) is exceeded, the full length of the lens will become greater and spherical aberration will become under, and this is not good.

Some numerical value embodiments of the present invention will be shown below. In each numerical value embodiment, Ri represents the radius of curvature of the ith lens surface from the object side, Di represents the thickness and air gap of the ith lens from the object side, and Ni and vi represent the refractive index and Abbe's number, respectively, of the glass of the ith lens from the object side. Also, in each numerical value embodiment, R9 to R12 indicate the surfaces of the variable angle prism, and R13 and R14 indicate the surfaces of the erecting prism.

Also, the relations between the aforementioned conditional expressions and the various numerical values in the numerical value embodiments are shown in Table 1 below.
(Numerical Value Embodiment 1)

| f = 249.9 | fno = 1:5 | 2ω = 6.4° | |
|---|---|---|---|
| r1 = 95.30 | d1 = 5.20 | n1 = 1.51633 | ν1 = 64.2 |
| r2 = 2673.19 | d2 = 0.40 | | |
| r3 = 124.79 | d3 = 6.00 | n2 = 1.49700 | ν2 = 81.6 |
| r4 = −186.65 | d4 = 10.00 | | |
| r5 = −130.10 | d5 = 2.60 | n3 = 1.60311 | ν3 = 60.7 |
| r6 = −1762.81 | d6 = 11.35 | | |
| r7 = −902.55 | d7 = 2.00 | n4 = 1.64769 | ν4 = 33.8 |
| r8 = 108.72 | d8 = 44.40 | | |
| r9 = ∞ | d9 = 1.60 | n5 = 1.51633 | ν5 = 64.2 |
| r10 = ∞ | d10 = 3.30 | n6 = 1.41650 | ν6 = 52.2 |
| r11 = ∞ | d11 = 1.60 | n7 = 1.51633 | ν7 = 64.2 |
| r12 = ∞ | d12 = 20.00 | | |
| r13 = ∞ | d13 = 120.00 | n8 = 1.56883 | ν8 = 56.3 |
| r14 = ∞ | d14 = 40.25 | | |

-continued

| f = 249.9 | fno = 1:5 | 2ω = 6.4° | |
|---|---|---|---|
| r15 = 27.16 | d15 = 6.00 | n9 = 1.62299 | ν9 = 58.2 |
| r16 = 30.90 | | | |

(Numerical Value Embodiment 2)

| f = 248.9 | fno = 1:5 | 2ω = 6.4° | |
|---|---|---|---|
| r1 = 103.91 | d1 = 5.09 | n1 = 1.62299 | ν1 = 58.2 |
| r2 = −4803.53 | d2 = 0.19 | | |
| r3 = 54.77 | d3 = 8.51 | n2 = 1.49700 | ν2 = 81.6 |
| r4 = −514.24 | d4 = 9.38 | | |
| r5 = −215.30 | d5 = 2.10 | n3 = 1.51742 | ν3 = 52.4 |
| r6 = 96.44 | d6 = 7.98 | | |
| r7 = 228.79 | d7 = 1.80 | n4 = 1.64769 | ν4 = 33.8 |
| r8 = 47.07 | d8 = 21.21 | | |
| r9 = ∞ | d9 = 1.60 | n5 = 1.51633 | ν5 = 64.2 |
| r10 = ∞ | d10 = 3.30 | n6 = 1.41650 | ν6 = 52.2 |
| r11 = ∞ | d11 = 1.60 | n7 = 1.51633 | ν7 = 64.2 |
| r12 = ∞ | d12 = 20.00 | | |
| r13 = ∞ | d13 = 122.00 | n8 = 1.56883 | ν8 = 56.3 |
| r14 = ∞ | d14 = 38.37 | | |
| r15 = 70.38 | d15 = 4.00 | n9 = 1.70154 | ν9 = 41.2 |
| r16 = 240.70 | | | |

(Numerical Value Embodiment 3)

| f = 249.9 | fno = 1:5 | 2ω = 6.4° | |
|---|---|---|---|
| r1 = 93.19 | d1 = 6.87 | n1 = 1.62299 | ν1 = 58.2 |
| r2 = −559.73 | d2 = 8.18 | | |
| r3 = 73.06 | d3 = 4.93 | n2 = 1.51633 | ν2 = 64.2 |
| r4 = 295.07 | d4 = 2.20 | | |
| r5 = −1293.45 | d5 = 2.10 | n3 = 1.60311 | ν3 = 60.7 |
| r6 = 164.46 | d6 = 22.44 | | |
| r7 = 182.35 | d7 = 1.80 | n4 = 1.80518 | ν4 = 25.4 |
| r8 = 52.71 | d8 = 7.46 | | |
| r9 = ∞ | d9 = 1.60 | n5 = 1.51633 | ν5 = 64.2 |
| r10 = ∞ | d10 = 3.30 | n6 = 1.41650 | ν6 = 52.2 |
| r11 = ∞ | d11 = 1.60 | n7 = 1.51633 | ν7 = 64.2 |
| r12 = ∞ | d12 = 20.00 | | |
| r13 = ∞ | d13 = 122.00 | n8 = 1.56883 | ν8 = 56.3 |
| r14 = ∞ | d14 = 38.12 | | |
| r15 = 121.71 | d15 = 4.00 | n9 = 1.62004 | ν9 = 36.3 |
| r16 = −393.65 | | | |

TABLE 1

| Conditional Expressions | Numerical Value Embodiments | | |
|---|---|---|---|
| | 1 | 2 | 3 |
| (1) ν$_{VAP}$ − ν$_{P2}$ | −6 | 11 | 15.9 |
| (2) ν$_{P1}$ − ν$_{P2}$ | 14.7 | 28.7 | 24.9 |
| (3) ν$_{P1}$ − ν$_{N11}$ | 12.2 | 17.5 | 0.5 |
| (4) ν$_{P1}$ − ν$_{N12}$ | 39.1 | 36.1 | 35.8 |
| (5) ν$_{VAP}$ − ν$_{RP}$ | −4.1 | −4.1 | −4.1 |
| (6) L1/f | 0.328 | 0.226 | 0.187 |
| (7) L2/f | 0.178 | 0.085 | 0.090 |
| (8) f2/f | 0.893 | 0.564 | 0.603 |
| (9) lf$_{N11}$/fl | 0.932 | 0.516 | 0.970 |
| (10) lf$_{N12}$/fl | 0.599 | 0.369 | 0.372 |

In the foregoing description, emphasis has been laid on the relation between the objective lens L1 and the variable angle prism.

Another embodiment will now be described with emphasis laid on the relation between the variable angle prism and the optical prism disposed behind it.

FIGS. 13 to 16 are schematic views of an optical system having image deflecting means.

In FIGS. 13 to 16, $L_o$ designates an objective lens group, and VAP denotes image deflecting means comprising a variable angle prism having its prism vertical angle variable, as previously described. RP designates an erecting prism comprising, for example, a porroprism. RP1 and RP2 in FIGS. 15 and 16 denote rectangular prisms. The rectangular prisms RP1 and RP2 together constitute an erecting prism for erecting an image. The variable angle prism is disposed between these rectangular prisms. In these figures, the optical path is shown as a developed glass block. IP designates the imaging plane of the objective lens $L_o$, and $L_e$ denotes a lens group such as an eyepiece having positive refractive power to enlarge an aerial image formed on the imaging plane IP. When RP (or RP1 and RP2) is used, the aerial image of an inverted real image is formed on the imaging plane IP.

Now, in designing such an optical system, each optical requirement is first determined such that in a reference state in which the variable angle prism is made parallel, each aberration is within an allowable range. However, by the vertical angle of the variable angle prism VAP being varied, chromatic aberration, particularly chromatic aberration of magnification, is created by the prism action to thereby deteriorate the image.

So, in the present embodiment, each optical element is set within a range which satisfies the following conditions, and chromatic aberration of magnification created in the variable angle prism is corrected and mitigated by the optical prism behind it. Specifically, when $v_{VAP}$ is the Abbe's number of the variable angle prism and $v_{RP}$ is the Abbe's number of the prism lying on the image side of the variable angle prism, chromatic aberration of magnification is corrected with the following condition satisfied:

$$-20 < v_{VAP} - v_{RP} < 40 \tag{11}$$

Also, when the distance from that vertex of the objective lens $L_o$ which is most adjacent to the object side to that surface of the variable angle prism which is adjacent to the object side is $L_1$ and the focal length of the whole system (to the imaging plane IP) is $f_T$, the following condition is satisfied:

$$0.1 < L_1/f_T < 0.7 \tag{12}$$

Conditional expression (11) restricts the difference between the Abbe's number of the variable angle prism and the mean value of the Abbe's number of the erecting prism more adjacent to the image side than the variable angle prism. If the lower limit value of conditional expression (11) is exceeded, chromatic aberration of eccentric magnification created in the variable angle prism will become under, and if the upper limit value of conditional expression (11) is exceeded, chromatic aberration of eccentric magnification created in the variable angle prism will tend to become over, and this is not preferable. More desirably, the range of conditional expression (11) may be set to the order of $15 < v_{VAP} - v_{RP} < 25$.

Conditional expression (12) restricts the ratio of the spacing from that vertex of the positive lens group which is adjacent to the object side to that surface of the variable angle prism which is adjacent to the object side to the focal length of the whole system. If the lower limit value of conditional expression (12) is exceeded, chromatic aberration of magnification will become over or chromatic aberration of eccentric magnification will become under, and if the upper limit value of conditional expression (12) is exceeded, the variable angle prism will become too near to the image plane and therefore, the image deflecting effect will tend to decrease.

Further, in order to correct on-axis chromatic aberration and chromatic aberration of magnification in the objective lens group itself well, it is preferable that the objective lens group be comprised of at least one positive lens and at least one negative lens and that when the mean value of the Abbe's number of the positive lens in the objective lens group is $v_P$ and the mean value of the Abbe's number of the negative lens in the objective lens group is $v_N$, the following condition be satisfied:

$$10 < v_P - v_N < 60 \tag{13}$$

Conditional expression (13) restricts the difference between the mean value of the Abbe's number of the positive lens in the objective lens group and the mean value of the Abbe's number of the negative lens in the objective lens group. If the lower limit value of conditional expression (13) is exceeded, on-axis chromatic aberration will tend to become under, and if the upper limit value of conditional expression (13) is exceeded, on-axis chromatic aberration will tend to become over, and this is not preferable. More desirably, the range of conditional expression (13) may be set to the order of $13 < v_P - v_N < 40$.

The objective lens may preferably be comprised, in succession from the object side, as shown in an embodiment which will be described later, of a biconvex lens, a negative lens having strong power on the object side, a positive lens having strong power on the object side, and a negative lens having strong power on the image side, or in succession from the object side, of a biconvex lens, a negative lens having strong power on the object side, and a negative lens having strong power on the image side, or in succession from the object side, of a biconvex lens and a negative lens having strong power on the object side.

The focusing in the present embodiment will be effective in making the apparatus compact and light is weight if it is effected by moving the negative lens which is most adjacent to the image side.

The lens data of some numerical value embodiments of the present invention will be shown below. In the tables below, $r_i$ represents the radius of curvature of the ith lens surface as counted from the object side, $d_i$ represents the surface spacing of the ith lens surface as counted from the object side, and $n_i$ and $v_i$ represent the refractive index and Abbe's number, respectively, of the ith lens as counted from the object side for d-ray c.

In the drawings, FIGS. 9A, 23E, 24E, 25E, 26E, 27E, 28E and 30E show the lateral aberration on the axis before the variable angle prism is driven, and FIGS. 9B, 23F, 24F, 25F, 26F, 27F, 28F and 30F show the lateral aberration when the vertical angle of the variable angle prism is inclined by 1°.

Numerical Value Embodiment 4

| f = 248.8 | fno = 1:5 | 2ω = 6.4° | |
|---|---|---|---|
| r1 = 96.793(stop) | d1 = 8.00 | n1 = 1.49700 | υ1 = 81.6 |
| r2 = −142.778 | d2 = 0.23 | | |
| r3 = −131.947 | d3 = 4.10 | n2 = 1.80610 | υ2 = 41.0 |
| r4 = 131 282.095 | d4 = 33.00 | | |
| r5 = 56.962 | d5 = 5.00 | n3 = 1.60311 | υ3 = 60.7 |
| r6 = 151.335 | d6 = 7.50 | | |
| r7 = 139.060 | d7 = 2.00 | n4 = 1.65844 | υ4 = 50.9 |
| r8 = 43.334 | d8 = 45.00 | | |
| r9 = ∞ | d9 = 1.60 | n5 = 1.51633 | υ5 = 64.2 |
| r10 = ∞ | d10 = 3.30 | n6 = 1.41650 | υ6 = 52.2 |
| r11 = ∞ | d11 = 1.60 | n7 = 1.51633 | υ7 = 64.2 |
| r12 = ∞ | d12 = 10.00 | | |
| r13 = ∞ | d13 = 120.00 | n8 = 1.56883 | υ8 = 56.3 |
| r14 = ∞ | | | |

Numerical Value Embodiment 5

| f = 251 | fno = 1:5 | 2ω = 6.4° | |
|---|---|---|---|
| r1 = 98.897(stop) | d1 = 8.90 | n1 = 1.51633 | υ1 = 64.2 |
| r2 = −105.590 | d2 = 0.11 | | |
| r3 = −103.380 | d3 = 2.70 | n2 = 1.62004 | υ2 = 36.3 |
| r4 = −517.655 | d4 = 33.52 | | |
| r5 = 56.962 | d5 = 5.00 | n3 = 1.60311 | υ3 = 60.7 |
| r6 = 151.335 | d6 = 7.50 | | |
| r7 = 139.060 | d7 = 2.00 | n4 = 1.65844 | υ4 = 50.9 |
| r8 = 43.334 | d8 = 45.00 | | |
| r9 = ∞ | d9 = 1.60 | n5 = 1.51633 | υ5 = 64.2 |
| r10 = ∞ | d10 = 3.30 | n6 = 1.41650 | υ6 = 52.2 |
| r11 = ∞ | d11 = 1.60 | n7 = 1.51633 | υ7 = 64.2 |
| r12 = ∞ | d12 = 10.00 | | |
| r13 = ∞ | d13 = 120.00 | n8 = 1.56883 | υ8 = 56.3 |
| r14 = ∞ | | | |

Numerical Value Embodiment 6

| f = 250 | fno = 1:5 | 2ω = 6.4° | |
|---|---|---|---|
| r1 = 93.223 | d1 = 10.13 | n1 = 1.49700 | υ1 = 81.6 |
| r2 = −68.583 | d2 = 0.09 | | |
| r3 = −69.426 | d3 = 4.10 | n2 = 1.60311 | υ2 = 60.7 |
| r4 = −370.856 | d4 = 32.32 | | |
| r5 = 73.172 | d5 = 3.68 | n3 = 1.60311 | υ3 = 60.7 |
| r6 = 138.552 | d6 = 13.27 | | |
| r7 = 101.885(stop) | d7 = 2.00 | n4 = 1.63930 | υ4 = 44.9 |
| r8 = 45.875 | d8 = 45.08 | | |
| r9 = ∞ | d9 = 1.60 | n5 = 1.51633 | υ5 = 64.2 |
| r10 = ∞ | d10 = 3.30 | n6 = 1.41650 | υ6 = 52.2 |
| r11 = ∞ | d11 = 1.60 | n7 = 1.51633 | υ7 = 64.2 |
| r12 = ∞ | d12 = 10.00 | | |
| r13 = ∞ | d13 = 120.00 | n8 = 1.62004 | υ8 = 36.3 |
| r14 = ∞ | | | |

Numerical Value Embodiment 7

| f = 250.00313 | fno = 1:5 | 2ω = 6.4° | |
|---|---|---|---|
| r1 = 85.116 | d1 = 11.75 | n1 = 1.49700 | υ1 = 81.6 |
| r2 = −56.943 | d2 = 0.10 | | |
| r3 = −57.412 | d3 = 2.60 | n2 = 1.60311 | υ2 = 60.7 |
| r4 = −245.837 | d4 = 50.13 | | |
| r5 = 70.605 | d5 = 2.00 | n3 = 1.63930 | υ3 = 44.9 |
| r6 = 47.867 | d6 = 42.33 | | |
| r7 = ∞ | d7 = 1.60 | n4 = 1.51633 | υ4 = 64.2 |
| r8 = ∞ | d8 = 3.30 | n5 = 1.41650 | υ5 = 52.2 |
| r9 = ∞ | d9 = 1.60 | n6 = 1.51633 | υ6 = 64.2 |
| r10 = ∞ | d10 = 10.00 | | |
| r11 = ∞ | d11 = 120.00 | n7 = 1.62004 | υ7 = 36.3 |
| r12 = ∞ | | | |

Numerical Value Embodiment 8

| f = 249.7 | fno = 1:5 | 2ω = 6.4° | |
|---|---|---|---|
| r1 = 94.884 | d1 = 11.24 | n1 = 1.51633 | υ1 = 64.2 |
| r2 = −57.750 | d2 = 0.11 | | |
| r3 = −58.087 | d3 = 2.60 | n2 = 1.60562 | υ2 = 43.7 |
| r4 = −272.004 | d4 = 66.21 | | |
| r5 = 67.281 | d5 = 2.00 | n3 = 1.63930 | υ3 = 44.9 |

-continued

| f = 249.7 | fno = 1:5 | 2ω = 6.4° | |
|---|---|---|---|
| r6 = 46.336 | d6 = 23.09 | | |
| r7 = ∞ | d7 = 1.60 | n4 = 1.51633 | ν4 = 64.2 |
| r8 = ∞ | d8 = 3.30 | n5 = 1.41650 | ν5 = 52.2 |
| r9 = ∞ | d9 = 1.60 | n6 = 1.51633 | ν6 = 64.2 |
| r10 = ∞ | d10 = 10.00 | | |
| r11 = ∞ | d11 = 120.00 | n7 = 1.62004 | ν7 = 36.3 |
| r12 = ∞ | | | |

Numerical Value Embodiment 9

| f = 248.9 | fno = 1:5 | 2ω = 6.4° | |
|---|---|---|---|
| r1 = 156.441 | d1 = 7.27 | n1 = 1.51633 | ν1 = 64.2 |
| r2 = −114.619 | d2 = 0.13 | | |
| r3 = −113.201 | d3 = 2.50 | n2 = 1.64769 | ν2 = 33.8 |
| r4 = −332.564 | d4 = 132.21 | | |
| r5 = ∞ | d5 = 1.60 | n3 = 1.51633 | ν3 = 64.2 |
| r6 = ∞ | d6 = 3.30 | n4 = 1.41650 | ν4 = 52.2 |
| r7 = ∞ | d7 = 1.60 | n5 = 1.51633 | ν5 = 64.2 |
| r8 = ∞ | d8 = 10.00 | | |
| r9 = ∞ | d9 = 120.00 | n6 = 1.56833 | ν6 = 56.3 |
| r10 = ∞ | | | |

Numerical Value Embodiment 10

| f = 249 | fno = 1:5 | 2ω = 6.4° | |
|---|---|---|---|
| r1 = 156.441 | d1 = 7.27 | n1 = 1.51633 | ν1 = 64.2 |
| r2 = −114.619 | d2 = 0.13 | | |
| r3 = −113.201 | d3 = 2.50 | n2 = 1.64769 | ν2 = 33.8 |
| r4 = −332.564 | d4 = 80.00 | | |
| r5 = ∞ | d5 = 60.00 | n3 = 1.56883 | ν3 = 56.3 |
| r6 = ∞ | d6 = 10.00 | | |
| r7 = ∞ | d7 = 1.60 | n4 = 1.51633 | ν4 = 64.2 |
| r8 = ∞ | d8 = 3.30 | n5 = 1.41650 | ν5 = 52.2 |
| r9 = ∞ | d9 = 1.60 | n6 = 1.51633 | ν6 = 64.2 |
| r10 = ∞ | d10 = 10.00 | | |
| r11 = ∞ | d11 = 60.00 | n7 = 1.56883 | ν7 = 56.3 |
| r12 = ∞ | | | |

Values of Conditional Expressions

| | (11) | (12) | (13) |
|---|---|---|---|
| Numerical Value Embodiment 4 | −4.1 | 0.421 | 25.2 |
| Numerical Value Embodiment 5 | −4.1 | 0.417 | 18.85 |
| Numerical Value Embodiment 6 | 15.9 | 0.443 | 18.35 |
| Numerical Value Embodiment 7 | 15.9 | 0.436 | 28.8 |
| Numerical Value Embodiment 8 | 15.9 | 0.421 | 19.9 |
| Numerical Value Embodiment 9 | −4.1 | 0.571 | 30.4 |
| Numerical Value Embodiment 10 | −4.1 | 0.642 | 30.4 |

As described above, according to the present invention, an optical system having image deflecting means can be realized by a smaller number of lenses than in the conventional art. Thereby, when the present invention is used, for example, in binoculars using a pair of objective lenses, hand vibration is little and the details of an object can be observed well. Also, as compared with the conventional art, the number of lenses is small and therefore, the optical system of the present invention is low in cost and light in weight.

What is claimed is:

1. An image deflecting apparatus comprising:
    in succession from the object side,
    objective lens means for forming an image having a positive refracting power;
    variable angle prism means for transmitting a light of said objective lens means to deflect a travelling direction of the light by changing the variable angle; and
    a prism for changing a travelling direction of light which has been transmitted through said variable angle prism means,
    wherein said apparatus satisfies the following conditions:

$-20 < \nu_{VAP} - \nu_{RP} < 40,$ where $\nu_{VAP}$ is a value of Abbe's number of said variable angle prism means and $\nu_{RP}$ is a mean value of Abbe's number of said prism, and $0.1 < L_2/f < 0.3,$ where $L_2$ is an air gap between said objective lens means and said variable angle prism means, and f is a focal length of said apparatus.

2. An image deflecting apparatus according to claim 1, satisfying the following condition:

$0.1 < L_1/f < 0.7,$ where $L_1$ is the distance from the vertex of a lens surface of said objective lens means which is adjacent to the object side to a surface of a variable angle prism which is adjacent to the object side, and f is the focal length of the whole system.

3. An image deflecting apparatus according to claim 1, wherein said objective lens means has at least one positive lens and at least one negative lens, and said apparatus satisfies the following condition:

$10 < \nu_P - \nu_N < 60,$ where $\nu_P$ is the mean value of the Abbe's number of the positive lens in said objective lens means, and $\nu_N$ is the mean value of the Abbe's number of the negative lens in said objective lens means.

4. An image deflecting apparatus according to claim 3, wherein said objective lens means comprises, in succession from the object side, a biconvex lens, a negative lens having strong power on the object side, a positive lens having strong power on the object side, and a negative lens having strong power on the image side.

5. An image deflecting apparatus according to claim 1, further comprising second optical prism means disposed on the object side of said variable angle prism means.

6. An image deflecting apparatus according to claim 5, wherein an image formed by said objective lens means is made into an erect image by said optical prism means and said second optical prism means.

7. An image deflecting apparatus comprising in succession from an object side:
    objective lens means comprising a biconvex lens, a negative lens having a strong power on the object side, a positive lens having a strong power on the object side, and a negative lens having a strong power on an image side;
    a variable angle prism means for transmitting a light beam of said objective lens means to deflect a travelling direction of the light beam by changing the variable angle;
    and an optical prism unit for folding the light beam, wherein the following conditions are satisfied, $-20 < \nu_{VAP} - \nu_{RP} < 40,$ $0.1 < L_1/f_T < 0.7,$ where $\nu_{VAP}$ is a value of Abbe's number of said variable angle prism means, $\nu_{RP}$ is a value of Abbe's number of said optical prism unit, $L_1$ is a distance from a lens surface of said objective lens means which is most adjacent to the object side to a surface of said variable angle prism means at the object side, and $f_T$ is a focal length of the whole system to an image surface of said objective lens means.

8. An image deflecting apparatus comprising in succession from an object side:

objective lens means comprising a biconvex lens, a negative lens having a strong power on the object side, and a negative lens having a strong power on an image side;

a variable angle prism means for transmitting a light beam of said objective lens means to deflect a travelling direction of the light beam by changing the variable angle;

and an optical prism unit for folding the light beam, wherein the following conditions are satisfied, $$-20 < v_{VAP} - v_{RP} < 40,$$

$$0.1 < L_1/f_T < 0.7,$$

where $v_{VAP}$ is a value of Abbe's number of said variable angle prism means, $v_{RP}$ is a value of Abbe's number of said optical prism unit, $L_1$ is a distance from a lens surface of said objective lens means which is most adjacent to the object side to a surface of said variable angle prism means at the object side, and $f_T$ is a focal length of the whole system to an image surface of said objective lens means.

* * * * *

UNITED STATES PATENT AND TRADEMARK OFFICE
CERTIFICATE OF CORRECTION

PATENT NO. : 5,661,597  Page 1 of 2
DATED : August 26, 1997
INVENTOR(S) : Sugawara It is certified that error appears in the above-identified patent and that said Letters Patent is hereby corrected as shown below:

COLUMN 2:

Line 29, "$V_{VAP}$" should read --$V_{VAR}$--.

COLUMN 6:

Line 11, "Will" should read --will--;

Line 20, "$f_{11}$" should read --$f_{N11}$--.

COLUMN 9

Line 37, "light is" should read --light in--; and
Line 60, "r4 =131 282.095" should read --r4 =-282.095--

UNITED STATES PATENT AND TRADEMARK OFFICE
CERTIFICATE OF CORRECTION

PATENT NO. : 5,661,597
DATED : August 26, 1997
INVENTOR(S) : Sugawara

It is certified that error appears in the above-identified patent and that said Letters Patent is hereby corrected as shown below:

COLUMN 12

Line 11, "$0.1<L2/f<0.3$," should read --$0.01<L2/f<0.3$,-- and

Line 29, "$10<v_p-v_N<<60$" should read --$10<v_p-v_N<60$--.

Signed and Sealed this

Twenty-first Day of April, 1998

Attest:

BRUCE LEHMAN

Attesting Officer     Commissioner of Patents and Trademarks